Feb. 11, 1958 C. H. BARNETT 2,822,914
CONTROL FOR VERTICAL OVEN CONVEYORS
Filed Jan. 8, 1954 2 Sheets-Sheet 1

INVENTOR.
CHARLES H. BARNETT
BY
Oberlin & Limbach
ATTORNEYS.

Feb. 11, 1958 C. H. BARNETT 2,822,914
CONTROL FOR VERTICAL OVEN CONVEYORS
Filed Jan. 8, 1954 2 Sheets-Sheet 2
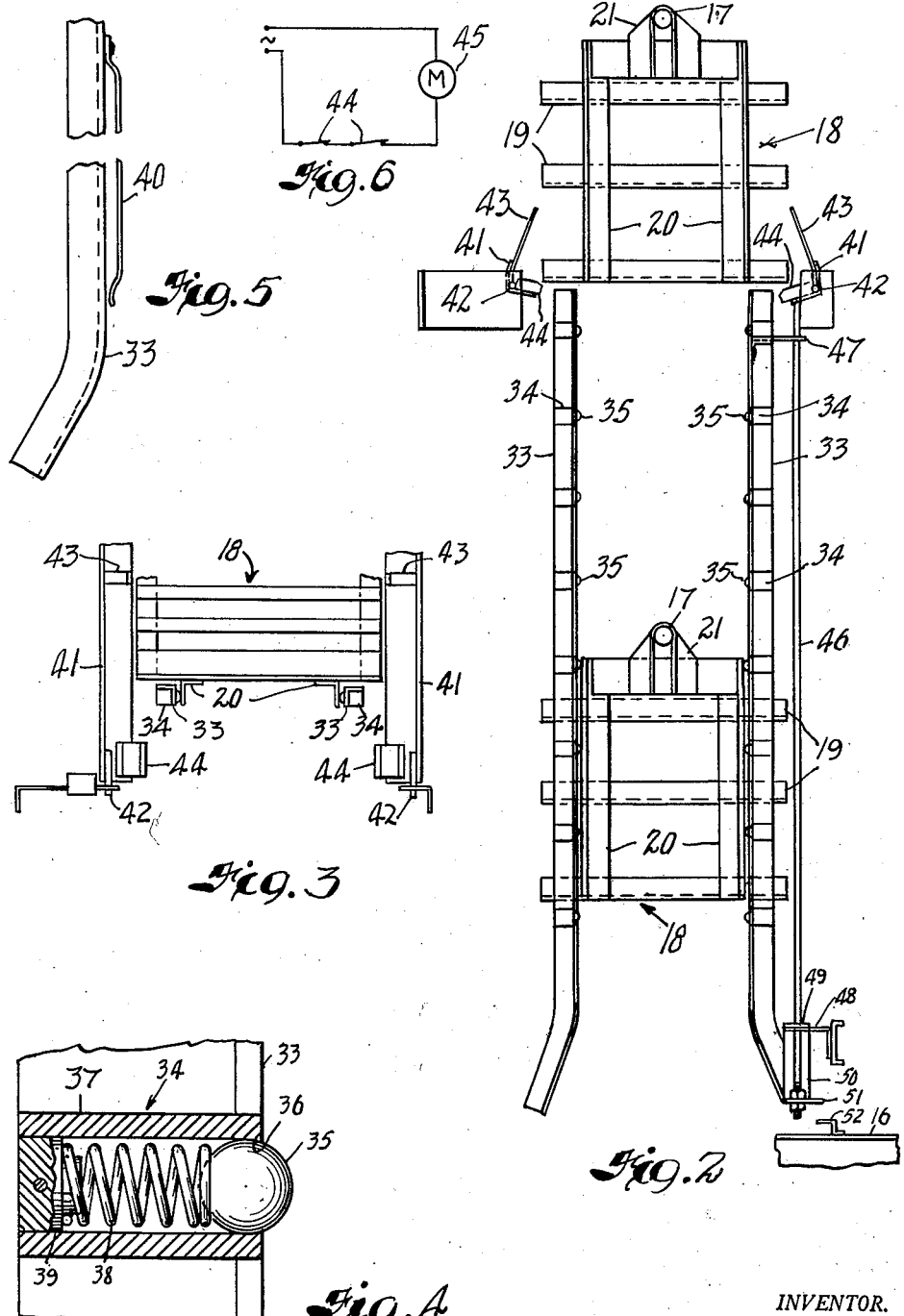
INVENTOR.
CHARLES H. BARNETT
BY
Oberlin & Limbach
ATTORNEYS.

United States Patent Office 2,822,914
Patented Feb. 11, 1958

2,822,914

CONTROL FOR VERTICAL OVEN CONVEYORS

Charles H. Barnett, Shaker Heights, Ohio, assignor to The Foundry Equipment Company, Cleveland, Ohio, a corporation of Ohio Application January 8, 1954, Serial No. 402,920

2 Claims. (Cl. 198—158)

The present invention, relating as indicated to conveyor control, is more particularly concerned with an improved control for conveyors equipped with work carriers which are pivotally attached thereto, this construction being common in most vertical conveyors.

While not limited thereto, my control is intended primarily for use with the conveyors conventionally used in vertical continuous ovens, such as core and mold ovens, and will be considered with reference to such an application. Briefly, a conveyor construction of this type comprises a continuous chain, or the equivalent, provided with a drive sprocket at its upper end and a floating structural member or sprocket serving as a tensioning guide and take-up at the lower end of the conveyor. Attached at regularly spaced intervals are balanced work carriers each in the form of a plurality of shelves or trays, the attachments being pivotal in nature so that the shelves will remain in normal horizontal position despite reversal of the conveyor direction.

In the design of these ovens, clearances adequate for normal operation under balanced loading of the carriers are provided. During the travel of the carriers over the sprockets, wherein the motion has both vertical and horizontal components, there is no interference between adjacent carriers if they remain in the balanced load condition. A few degrees of carrier tilt can be tolerated, but beyond a certain point, interference between adjacent carriers will result. Additionally, the tilt may be such as to distort the work pieces and possibly cause such pieces to slide off the shelves.

The sprockets could, theoretically, be made large enough relative to the carrier spacing to eliminate possible interference of adjacent carriers due to tilting. This, of course, requires the entire oven construction to be enlarged and is not only uneconomical, but does not eliminate the possibility of distortion and spilling of the work also caused by tilting.

It is common to use guides at the loading station of such an oven to reduce carrier rocking movement, but these guides cannot be made to engage the carrier precisely, and there is, accordingly, a certain amount of clearance between the guides and carriers. When work is loaded on a carrier with a horizontal sliding motion, the carrier can, therefore, move transversely, causing slight jarring of the work which is sufficient in some cases to distort and collapse delicate cores or molds. It is, furthermore, impractical to continue the guides upward past the loading zone, and when a carrier clears the guides, it will be free to tilt if the load is not balanced. One further cause of interference between adjacent carriers as they pass over the head sprockets has been projection of the work too far beyond the carrier shelf edges.

It is my intention to provide a practical control for substantially eliminating the above-noted disadvantages in conveyor operation, that is, to reduce the possibilities of such improper operation and resultant damage insofar as practicable by a relatively inexpensive, yet highly efficient, means of control.

Another object of the invention is to provide such a control which affords positive stabilization of pivotally attached conveyor work carriers, particularly in the loading zone where the carriers are most likely to be jarred by the placing of the work thereon.

A further object is the provision of means for stopping a conveyor equipped with such carriers in the event any carrier assumes a tilt about its axis of attachment. The conveyor is likewise stopped if the work is so placed as to project improperly beyond the carrier sides.

It is also an object of the invention to provide a control which stabilizes such work carriers in the conveyor loading zone and causes the conveyor to stop if any carrier tilts after leaving the restraining influence of the stabilizing means, such for example as caused by unbalanced loading of the work.

A still further object is to provide control means for stopping the conveyor in the event of carrier interference and the like causing jamming; more particularly, to effect this control in response to the increase in conveyor tension produced by a jam.

Additional objects are: to provide means for stopping such a conveyor in response both to tilting of the work carriers and jamming of the conveyor; to provide carrier stabilizing means in the conveyor loading zone in combination with means for stopping the conveyor in the event of a jam; and to provide a combined control which affords the stabilization, tilt responsiveness, and stoppage on jamming, all as set forth.

Other objects and advantages will become apparent as the following description proceeds.

To the accomplishment of the foregoing and related ends, the invention, then, comprises the features hereinafter fully described and particularly pointed out in the claims, the following description and the annexed drawings, setting forth in detail certain illustrative embodiments of the invention, these being indicative, however, of but a few of the various ways in which the principle of the invention may be employed.

In said annexed drawings:

Fig. 2 is a fragmentary elevation on an enlarged scale showing the control elements I provide in the region of the conveyor loading station;

Fig. 3 is a fragmentary plan view illustrating certain of these control elements and their operative relation to a work carrier;

Fig. 4 is a longitudinal section of a ball spring guide adapted to engage the work carriers of the conveyor at the loading zone;

Fig. 5 is an elevation of a portion of a vertical guide member mounting a spring finger in lieu of a ball spring guide for engaging the work carriers; and Fig. 6 is a wiring diagram of the energization circuit for the conveyor drive motor.

Figure 1:
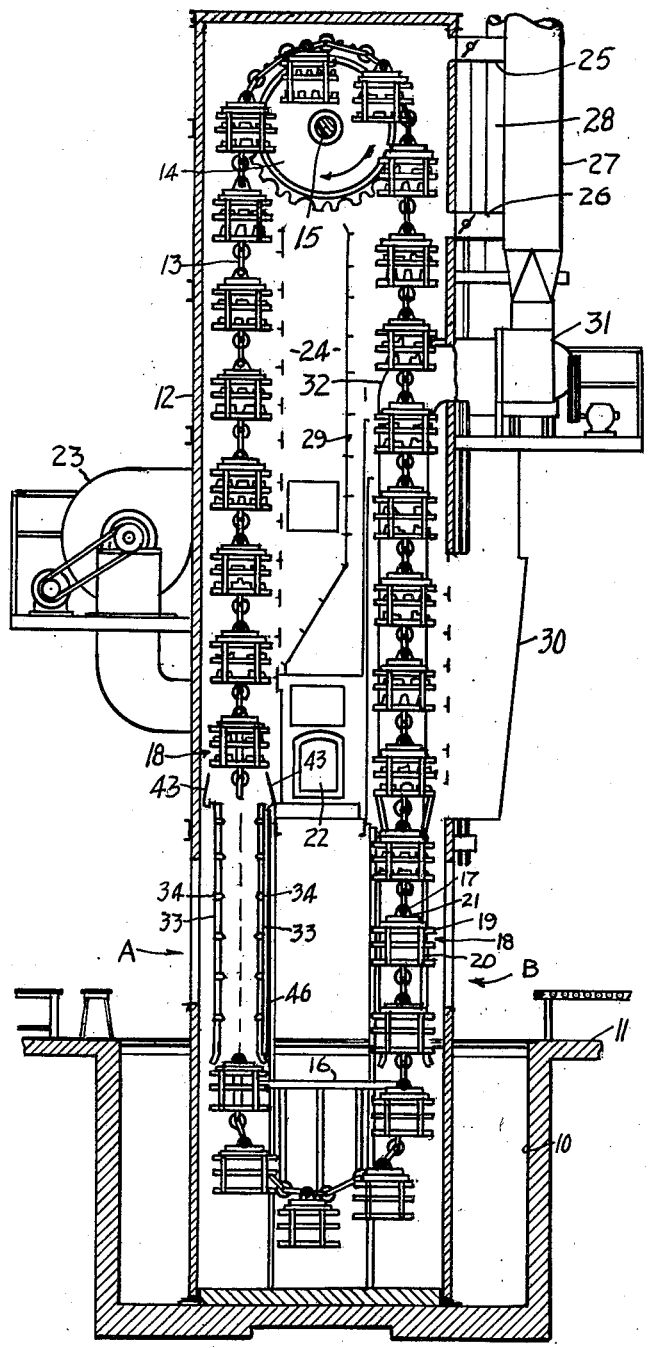
Fig. 1 illustrates a continuous vertical core oven of conventional type, sectioned vertically to expose the conveyor structure with which my control is adapted to be used.

Referring now to the drawings in detail, the vertical continuous core oven shown in Fig. 1 is conventional apart from the control elements and actions to be described in detail hereinafter, and its major components and general operation will, therefore, be set forth only briefly.

The oven proper is in the form of a tower suitably supported in a pit 10 below the plant floor 11 and having a heat-insulating casing 12 enclosing its sides over the major portion of its extent above the floor. Access is provided workmen both centrally and at the respective sides of the tower, at the loading zone A and unloading zone B, to the conveyor which transports the work through the enclosed tower portion, wherein it is dried by being subjected to heated air. The conveyor conventionally comprises two matched strands of chain engaged by drive sprockets at the top of the tower and by a lower structural take-up. One chain and sprocket are shown respectively at 13 and 14, the latter being mounted on headshaft 15 for rotation in the direction of the arrow, while the take-up is indicated by reference numeral 16.

Extending between the matched strands of chain at regularly spaced intervals are cross rods 17 adapted to support the work carriers 18. Each carrier has a plurality of rectangular shelves or trays 19 held horizontally in spaced relation by two laterally spaced vertical angle members 20 at their respective ends. Secured at the tops of the carriers are collars 21 which suspend the carriers freely on the cross rods at their approximate longitudinal centerlines, so that the carriers will normally be balanced about the resulting individual pivotal axes of attachment.

Located centrally of the tower, near the bottom of the enclosed portion, is a furnace 22 which heats air drawn therethrough by blower 23 and forced into the oven supply manifold 24. The hot air circulates over the moving work carriers and may be exhausted through the flues 25 and 26 and stacks 27 and 28. Some of this air is recirculated through the furnace by means of the recirculating duct 29, and cooling air is supplied by means of a boot 30 over a predetermined extent of the conveyor just preceding the unloading zone. Blower 31 withdraws the cooling air through suitable ducts, one of which is shown at 32, and discharges the same into the stack 27.

The structure thus far described is now well-known in the art and does not in itself form a part of my invention. As indicated earlier, the invention is concerned with the control of conveyors of the type set forth, with the general objective of eliminating the noted disadvantages inherent in the operation thereof.

It will be apparent from Fig. 1 that practical construction of this type conveyor does not allow a great deal of clearance between the adjacent carriers 18 as they move about the drive sprockets 14. Any noticeable tilting of a carrier, or projection of the work thereon beyond the sides of the shelves, will cause interference, damaging the work and possibly jamming the conveyor. Rocking or tilting of the individual carriers is most apt to occur in the acts of loading and unloading the work, and of these two critical zones, the former is of greater importance, since the green work is more readily damaged by jarring and tilting. The work should, of course, be distributed on the carrier shelves in balanced condition, and a more or less permanent tilt will be assumed by any carrier not properly loaded in this respect.

In order to afford positive stabilization of the carriers as the work is being loaded thereon, I provide stationary vertical guide rails 33 of a construction such to engage resiliently the work carriers as they move through the loading zone A, with this engagement effectively restraining the carriers from rocking about their axes of attachment. As shown more clearly in Figs. 2 and 3, each rail 33 supports a plurality of vertically spaced ball spring guides 34, and the two rails are spaced apart with the balls 35 of their respective guides facing inwardly in opposition. The rails are so located as to be adjacent an end of a carrier in the loading zone, and the lateral spacing thereof corresponds to the spacing of the angle members 20 of the carriers, so that the balls engage the latter in such zone. The end members 20 of the carriers, therefore, additionally serve as guide surfaces adapted to be engaged by the ball spring guides at opposite sides and thus restrain the moving carriers from any rocking motion. The spacing of the ball spring guides in the rails is preferably such at least three guides of each rail are engaged with the members 20 of a carrier as long as the same is in the loading zone.

In Fig. 4, one of the ball spring guides 34 is shown on an enlarged scale and it will be seen that the ball 35 thereof is seated in a tapered reduced end 36 of a hollow cylinder 37. An inner spring 38 engages the ball at one end and at its other end with a plug 39 fitted in the outer end of the cylinder. The diameter of the opening 36 is less than the diameter of the ball so that the latter will not move completely through the opening and the spring, of course, biases the ball resiliently outwardly. All guides 34 are similarly constructed. As an alternative construction, the guide rails 33 may be provided with spring fingers in lieu of the ball spring guides, arranged and operative in like manner. One such finger is shown at 40 in Fig. 5.

The stabilization means just discussed insures that the several carriers will not be rocked or jarred in the art of placing the work thereon. Once a loaded carrier clears the guide rails, however, it is free to tilt if the load has not been properly balanced, and I, therefore, provide further control means for stopping the conveyor if this occurs, and also in the event that any work projects improperly beyond the sides of the shelves, this latter condition possibly occurring although the load is balanced. At each side of the conveyor an angle member 41 is supported horizontally by means of pivot pins 42 connecting the ends thereof to suitable brackets attached to the oven structure. The two members are positioned respectively adjacent the upper ends of guide rails 33, and each has one or more feeler bars 43 secured thereto and extending upwardly and inwardly in the direction of the moving carriers. The free ends of the feeler bars are spaced slightly from the respective sides of a work carrier therebetween and define the limits of lateral carrier projection.

It will be seen that tilting of any carrier to either side when the same enters between these feeler bars will cause at least one bar to be engaged and so moved as to pivot the respectively associated angle member 41 about its supporting pins. Mounted on each member 41 to partake of the limited rocking movement of the same is a tilt switch indicated generally by reference numeral 44. The two such switches may be of any well-known type, for example, conventional mercury switches could be used and they are adjusted to be in closed condition when the members 41 are as shown in Fig. 2 and opened by tilting of the members about their respective pivotal connections. The switches are connected in series, as shown in Fig. 6, in the energization circuit of the motor 45 which drives the headshaft 15 and, hence, the conveyor. Opening of either switch will, therefore, stop the conveyor.

It will be apparent that this control action is responsive both to tilting of a carrier and improper work projection though the load may be balanced. As a further safety, I also provide means for stopping the conveyor in the event of a jam, and utilize one of the tilt switches 44 additionally for this purpose.

A vertical operating rod 46 is arranged with its upper end engaging the inboard angle member 41 in the normal position of the latter and its lower end spaced a predetermined distance above the floating take-up 16 at the bottom of the conveyor. A guide 47 is provided near the upper end of the rod and at the lower end a bracket 48 secured to a structural member of the oven also serves as a guide and supports the rod for vertical reciprocation. Bracket 48 engages the underside of an upper flange 49 of member 50 attached to the rod, when the latter is in lowermost position. A projection 51 of the member 50 is spaced a predetermined distance above an actuating member 52 secured to the top of the take-up.

Since the take-up is "floating," it will move vertically in response to an increase in conveyor tension, and when raised sufficiently, projection 51 will be engaged by member 52 to lift the rod and thus rock the inner member 41. This action causes switch 44 on such member to open with the result that the conveyor is stopped. Any interference and the like causing a conveyor jam will produce such an increase in tension, due to continued rotation of the headshaft with movement of the chain stopped beyond the point of the jam, and the conveyor drive will, therefore, be automatically interrupted by the control if a jam occurs.

The complete system of control described in the foregoing may be applied to equal advantage in vertical conveyors of different construction, such as used in the so-called L-shaped ovens, and generally to conveyors having work carriers attached in such manner as to be susceptible to swinging or rocking movement. If desired, vertical guide rails of the nature set forth may also be provided at the unloading zone of a conveyor to stabilize the carriers similarly in this zone.

Other modes of applying the principle of the invention may be employed, change being made as regards the details described, provided the features stated in any of the following claims, or the equivalent of such, be employed.

I therefore particularly point out and distinctly claim as my invention:

1. In vertical oven construction, a continuous vertical conveyor, a plurality of work carriers having normally horizontal trays adapted to receive and support the work thereon, said carriers being suspended from said conveyor at spaced points therealong by means of horizontal pivotal connections, each such carrier being provided with two spaced vertical guide surfaces in planes generally parallel to the axis of its pivotal connection, a pair of stationary rails arranged respectively adjacent the paths of movement of the carrier guide surfaces in a vertical course of the conveyor, and a plurality of ball spring guides mounted on each rail adapted to engage the guide surfaces of the several carriers as the same move past said rails, the ball spring guides being spaced vertically relative to the extent of the guide surfaces such that at least two guides of each rail engage simultaneously with the respectively associated guide surfaces, thereby to restrain the carriers from rocking about their pivotal connections.

2. In vertical oven construction, a continuous vertical conveyor, a plurality of work carriers having normally horizontal trays adapted to receive and support the work thereon, said carriers being suspended from said conveyor at spaced points therealong by means of horizontal pivotal connections, each such carrier being provided with two spaced vertical guide surfaces in planes generally parallel to the axis of its pivotal connection, a pair of stationary rails arranged respectively adjacent the paths of movement of the carrier guide surfaces in a vertical course of the conveyor, and a plurality of resilient spring fingers attached in vertically spaced relation to each of said rails adapted simultaneously to engage the guide surfaces of the several carriers as the same move past the rails, thereby to restrain the carriers from rocking about their pivotal connections.

References Cited in the file of this patent

UNITED STATES PATENTS

| | | |
|---|---|---|
| 1,240,172 | Breneman | Sept. 18, 1917 |
| 1,757,819 | Taylor | May 6, 1930 |
| 1,977,732 | Mattler | Oct. 23, 1934 |
| 2,011,893 | De Wolfe | Aug. 20, 1935 |
| 2,338,962 | Olson | Jan. 11, 1944 |
| 2,408,760 | Dunlop | Oct. 8, 1946 |
| 2,472,914 | Mercier | June 14, 1949 |
| 2,629,486 | Eggleston et al. | Feb. 24, 1953 |

FOREIGN PATENTS

| | | |
|---|---|---|
| 617,900 | France | Nov. 30, 1926 |